United States Patent
Osawa et al.

(10) Patent No.: US 7,124,935 B2
(45) Date of Patent: Oct. 24, 2006

(54) CHECK MULTIFEED DETECTION APPARATUS FOR USE IN A CHECK PROCESSING TERMINAL AND DETECTION METHOD

(75) Inventors: Kohei Osawa, Suwa (JP); Norio Nagata, Matsumoto (JP); Kunio Omura, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/978,017

(22) Filed: Oct. 28, 2004

(65) Prior Publication Data

US 2005/0145689 A1    Jul. 7, 2005

(30) Foreign Application Priority Data

Oct. 31, 2003  (JP) .............................. 2003-372587

(51) Int. Cl.
*B65H 7/12*    (2006.01)
(52) U.S. Cl. ...................... 235/379; 902/16; 271/262
(58) Field of Classification Search ................ 235/379; 705/45; 902/16; 271/258.01, 262, 265.04
See application file for complete search history.

(56) References Cited

U.S. PATENT DOCUMENTS 6,012,633 A * 1/2000 Ochiai et al. ............... 235/379
6,109,521 A * 8/2000 Martinez et al. ............ 235/379
6,257,783 B1   7/2001 Hanaoka et al.
6,896,117 B1 * 5/2005 Nomura ..................... 194/213
2003/0118384 A1  6/2003 Moriyama et al.

FOREIGN PATENT DOCUMENTS

| JP | 50-2833 | 1/1975 |
|---|---|---|
| JP | 60-144256 | 7/1985 |
| JP | 2-147448 | 6/1990 |
| JP | 05-024713 | 2/1993 |
| JP | 05-147773 | 6/1993 |
| JP | 07-172631 | 7/1995 |
| JP | 10-181950 | 7/1998 |
| JP | 2000-099798 | 4/2000 |
| JP | 2000-344428 | 12/2000 |
| JP | 2003-192187 | 7/2003 |

\* cited by examiner

*Primary Examiner*—Thien M. Le
*Assistant Examiner*—Jamara A. Franklin
(74) *Attorney, Agent, or Firm*—Anderson Kill & Olick, PC (57) ABSTRACT

A multifeed detection apparatus and method for use in a check processing terminal including a paper supply unit for individually feeding a plurality of checks from the paper supply unit along a check transportation path in a given direction; a MICR head having a non-movable contact surface on one side of the check transportation path; a pressure member disposed on another side of the check transportation path opposite the non-movable contact surface for pressing one or more transported checks between the pressure member and the MICR head; and a displacement detection sensor for detecting physical displacement of the pressure member from the non-movable contact surface to indicate check thickness.

10 Claims, 11 Drawing Sheets

CHECK MULTIFEED DETECTION APPARATUS FOR USE IN A CHECK PROCESSING TERMINAL AND DETECTION METHOD

BACKGROUND OF THE INVENTION

1. Field of Technology

The present invention relates to a check multifeed detection apparatus for use in a check processing terminal and a multifeed detection method.

2. Description of Related Art

Payment systems using checks are widely used throughout Europe and North America, Asia (worldwide). This payment system enables businesses and consumers to use checks to make payments and financial transfers of many kinds. When a check is written, it is ultimately presented to the bank on which the check was drawn to either deposit or withdraw funds.

Bank tellers at each bank branch typically process many checks in a short time. The bank teller also typically confirms check validity, the check date, and the signature before completing the deposit or withdrawal. The teller also prints an endorsement on the back, and issues a transaction receipt as required. The teller may also require a driver license or other photo ID to check the identity of the person presenting the check, and in some situations may make a photocopy of the license or photo ID using a copying machine. A copy of the check is also captured and stored using a specialized check scanner.

Efforts to electromagnetically read information from checks have started in order to provide more efficient check processing. Part of this process is to electromagnetically read each check at the teller window using compact check processing terminals that can be installed at each teller window.

These check processing terminals have a magnetic ink character reader (MICR), scanner, and printing mechanism disposed along the check transportation path. When a check is received from a customer, the teller passes the check through the check processing terminal. The check processing terminal thus reads the magnetic ink characters printed on the check, captures an image of the check, and may print an endorsement on the back. See, for example, Japanese Unexamined Patent Appl. Pub. 2000-344428.

A common problem of check processing terminals with this type of medium transportation path is that two or more checks may unintentionally be conveyed simultaneously along the transportation path. This is called "multifeed," and the problem is inherent.

To solve this problem, Japanese Patent 3421104 teaches a multifeed detection apparatus having a reflection sensor located near the paper guide defining the form transportation path. This reflection sensor detects light reflected by the surface of the transported medium to directly detect the thickness of the paper and thereby detect check multifeeding.

Japanese Unexamined Patent Appl. Pub. S60-144256 also teaches a multifeed detection apparatus having a lever disposed to the roller shaft of the paper transportation roller to detect multifeeding by using optical sensors, for example, to detect displacement of the lever due to the paper thickness.

A multifeed detection apparatus having such a lever is described more specifically below with reference to FIG. 8.

Figure 8:
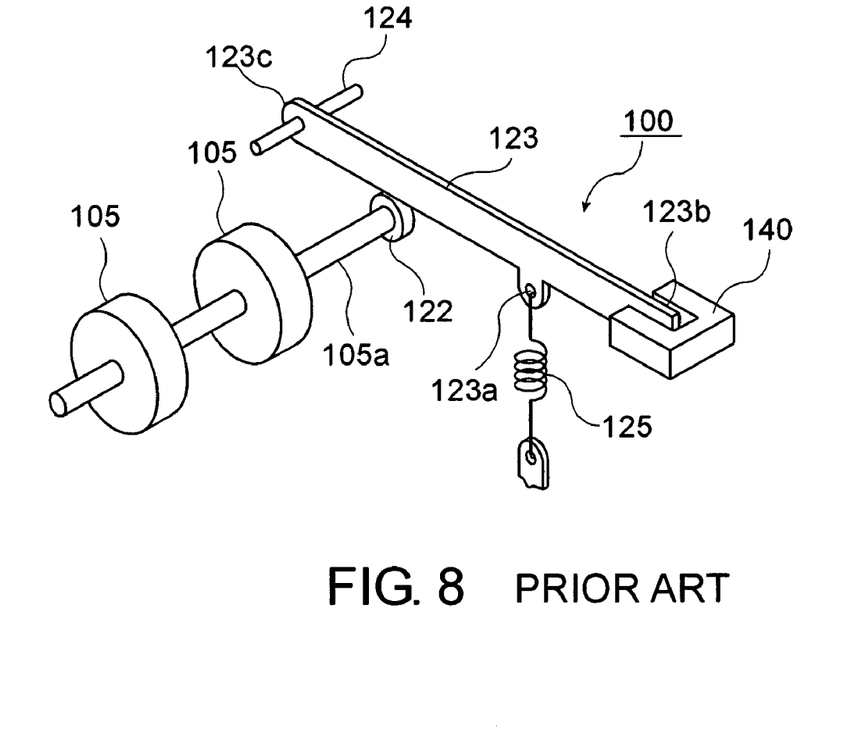
FIG. 8 is an oblique view of a multifeed detection apparatus according to the prior art.

The multifeed detection apparatus 100 shown in FIG. 8 has a detection lever 123 and a photodetector 140. The detection lever 123 is disposed on end portion 122 of rotary shaft 105a, which supports a pair of transportation rollers 105. This detection lever 123 is pivotably displaceable on a pivot shaft 124 disposed to one end portion 123c of the detection lever 123, is urged downward as seen in FIG. 8 by a tension spring 125 hooked on a protrusion 123a, and the force of this spring 125 holds the detection lever 123 applying downward pressure on the end portion 122 of the rotary shaft 105a. The other distal end 123b of the detection lever 123 is thus located adjacent to the photodetector 140, and the photodetector 140 detects displacement of this distal end 123b of the detection lever 123.

When paper passes below the transportation rollers 105, the transportation rollers 105 and rotary shaft 105a are pushed upward according to the thickness of the paper. The rotary shaft 105a therefore also pushes the detection lever 123 up in resistance to the force of the spring 125 while the paper passes below the transportation rollers 105. The photodetector 140 detects this displacement of the detection lever 123, and the paper thickness can then be detected based on the displacement of this detection lever 123.

When the multifeed detection apparatus taught in Japanese Unexamined Patent Appl. Pub. 2000-344428 is used, the thickness difference between one and two sheets is extremely small, and the detection sensitivity of the reflection sensor used to detect light reflected from the medium must be sufficient to detect this slight difference.

Furthermore, when the multifeed detection apparatus that detects the displacement of the rotary shaft of the transportation rollers as taught in Japanese Patent 3421104 is used, the transportation rollers become compressed over time due to the applied pressure, or the center of the transportation rollers may become offset from the center of the rotary shaft so that the rollers turn eccentrically. The reference position of the rollers thus shifts, and the paper thickness cannot be accurately detected.

The present invention is therefore directed to the aforementioned problems, and an object of the present invention is to provide a multifeed detection apparatus capable of accurately detecting multifeed situations by means of a simple design, and to provide a hybrid processing apparatus having this multifeed detection apparatus.

SUMMARY OF THE INVENTION

To achieve the foregoing objects, the present invention provides a check multifeed detection apparatus for use in a check processing terminal which includes a paper supply unit for individually feeding a plurality of checks; a check transportation medium for conveying each check fed from said paper supply unit along a check transportation path in a given direction; and a reading unit disposed on one side of the check transportation path with the reading unit having a rigid member providing a rigid and stationary surface and an image sensor such as a MICR head for reading information from each check being transported along the check transportation path;

wherein the check multifeed detection apparatus comprises:

a pressure member disposed on another side of the check transportation path opposite to and in alignment with the rigid member for pressing one or more transported checks passing therebetween against the rigid and stationary surface of the rigid member and a displacement detection sensor for detecting the displacement of the pressure member by the transported check(s);

wherein the displacement detection sensor detects multifeeding based on the displacement of the pressure member according to the thickness of the check(s) passed between said pressure member and said rigid stationary surface. The MICR head reads magnetic ink characters printed on each check.

Preferably, the pressure member has a pressure portion for pressing the check to the rigid surface, and a detection surface opposing the displacement detection sensor, in an arrangement such that the displacement of the detection surface is greater than the displacement of the pressure portion.

Further preferably, the pressure member is a lever that can pivot circularly on a rotary shaft.

Further preferably, the displacement detection sensor is an optical sensor for measuring displacement distance of the pressure member.

The present invention also embodies a check multifeed detection method comprising the steps of:

individually feeding a plurality of checks from a paper supply unit;

conveying each check fed from the paper supply unit to a check transportation medium moving along a given transportation path;

locating a reading unit having a sensor such as an MICR head with a rigid stationary surface on one side of the transportation path for reading information from each check being transported along the check transportation path;

locating a pressure member on another side of the check transportation path opposite to and in alignment with said rigid stationary surface of said MICR head for pressing one or more transported checks passing therebetween against said rigid stationary surface; and detecting the displacement of the pressure member according to the check thickness. Feeding more than one check at a time is detected while reading MICR characters using the MICR head for reading magnetic ink characters printed on the check.

Because the pressure member presses against a rigid surface of the MICR head which is stationary in a MICR reading apparatus according to the present invention, the MICR head cannot be displaced and the rigid surface cannot be deformed by pressure from the pressure member. The rigid and stationary surface of the reading apparatus can therefore be used as a stable reference surface for determining displacement of the pressure member such as lever 30, and checks in a multifeed condition can be reliably detected based on this displacement reference surface. Check multifeeding can therefore be reliably detected by optically measuring the displacement of a pressure member that presses checks (a personal check or business check) to an MICR head having a rigid member used as a stationary reference surface.

DESCRIPTION OF THE PREFERRED EMBODIMENTS

A preferred embodiment of a check processing terminal incorporating a check multifeed detection apparatus (MICR reading apparatus) according to the present invention is described in detail below with reference to the accompanying figures.

Figure 1:
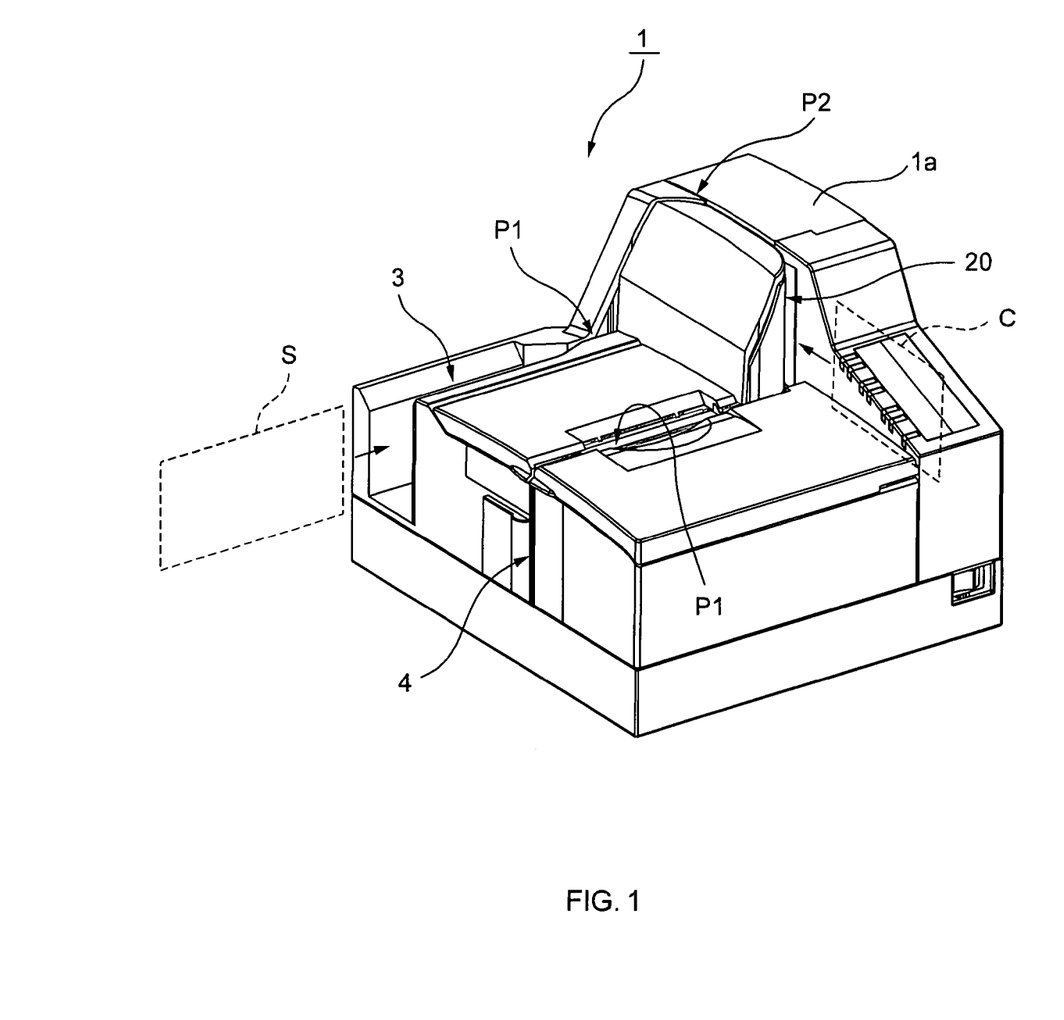
FIG. 1 is an oblique view showing a check processing terminal including a check multifeed detection apparatus (MICR reading apparatus) according to the present invention.

The check processing terminal shown in FIG. 1 can transport checks S through a first transportation path P1 formed in the case 1a, and can transport cards C through a second transportation path P2 likewise formed in the case 1a. The checks S are also referred to herein as a first scanning medium and are loaded into a paper supply section 3. The cards C are inserted from a card insertion slot 20, and are also referred to herein as a second scanning medium.

More specifically, the check processing terminal 1 shown in FIG. 1 includes an image scanner such as an MICR reader, and a printer in an arrangement such that the image scanner can image each check S to read the magnetic ink characters printed on the check S, and print on the check S as needed while conveying the check S through the first transportation path P1. Likewise a card C can be imaged while conveying the card C through the second transportation path P2.

Figure 2:
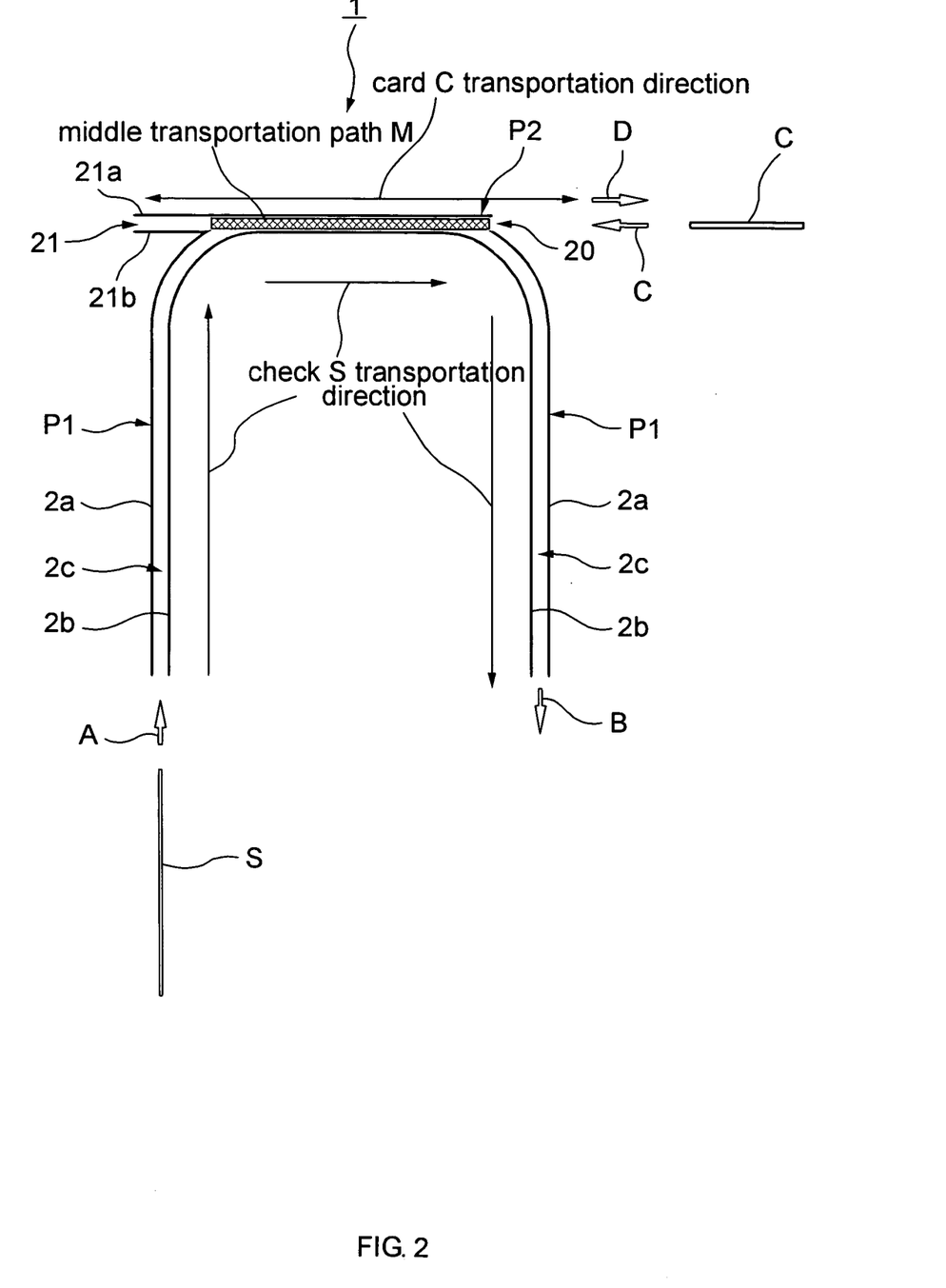
FIG. 2 is a schematic diagram of the paper transportation path in the check processing terminal of FIG. 1.

The check processing terminal shown in FIG. 1 includes a first transportation path P1 as is more clearly shown in FIG. 2 which is basically U-shaped and a second transportation path P2 which is straight for conveying cards C. The portion at the middle of the U-shaped path (shaded in FIG. 2) is shared by the first transportation path P1 and second transportation path P2, and this shared portion is referred to below as the middle transportation path M. Different reading devices are disposed to the check processing terminal 1 along this middle transportation path M. These reading devices are described in further detail below.

As shown in FIG. 2, the first transportation path P1 is formed by an outside guide 2a and an inside guide 2b so that a check S is conveyed through space, referred to as the transportation portion 2c below, between the outside guide 2a and inside guide 2b. A check S is inserted through the paper supply section 3 in the direction of arrow A in FIG. 3 to the first transportation path P1. Multiple checks S can be stocked in the paper supply section 3, which then supplies the checks individually into the first transportation path P1.

A first transportation roller pair 6 on the upstream side of the middle transportation path M, a middle transportation roller set 16 on the middle transportation path M, and a second transportation roller pair 7 on the downstream side of the middle transportation path M, are disposed to the first transportation path P1 as the transportation mechanism for conveying checks S.

The first transportation, roller pair 6 includes a drive roller 6a, and a pressure roller 6b disposed opposite the drive roller 6a with the first transportation path P1 therebetween.

The second transportation roller pair 7 likewise includes a drive roller 7a, and a pressure roller 7b disposed opposite the drive roller 7a with the first transportation path P1 therebetween.

Figure 3:
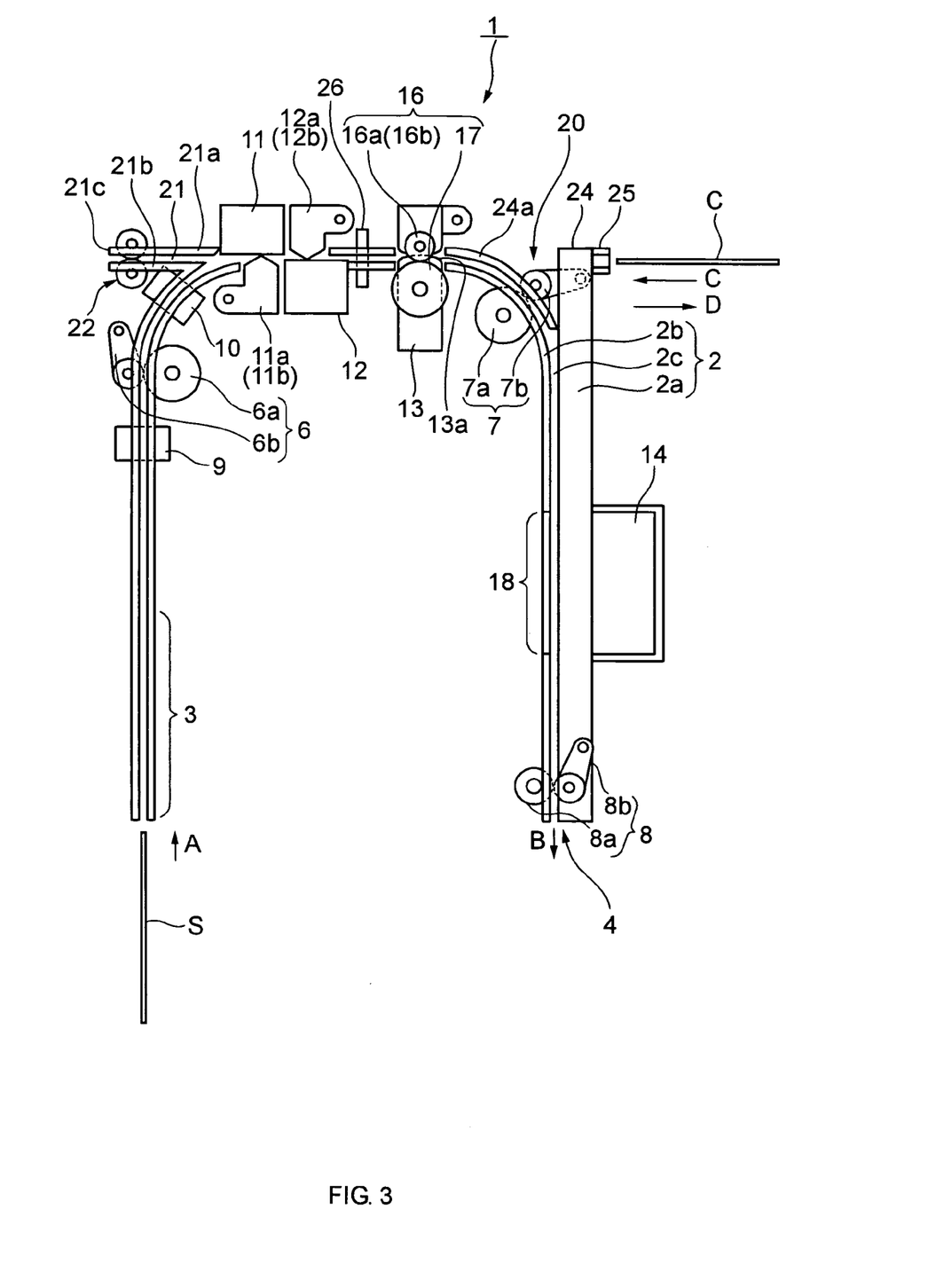
FIG. 3 is a schematic top view of the internal configuration of the check processing terminal of FIG. 1.

As shown in FIG. 3 the middle transportation roller set 16 includes a lower pressure roller 16b disposed to the lower part of the first transportation path P1, an upper pressure roller 16a disposed above the lower pressure roller 16b, and a drive roller 17 disposed opposite the upper pressure roller 16a and lower pressure roller 16b with the middle transportation path M therebetween.

Figure 4:
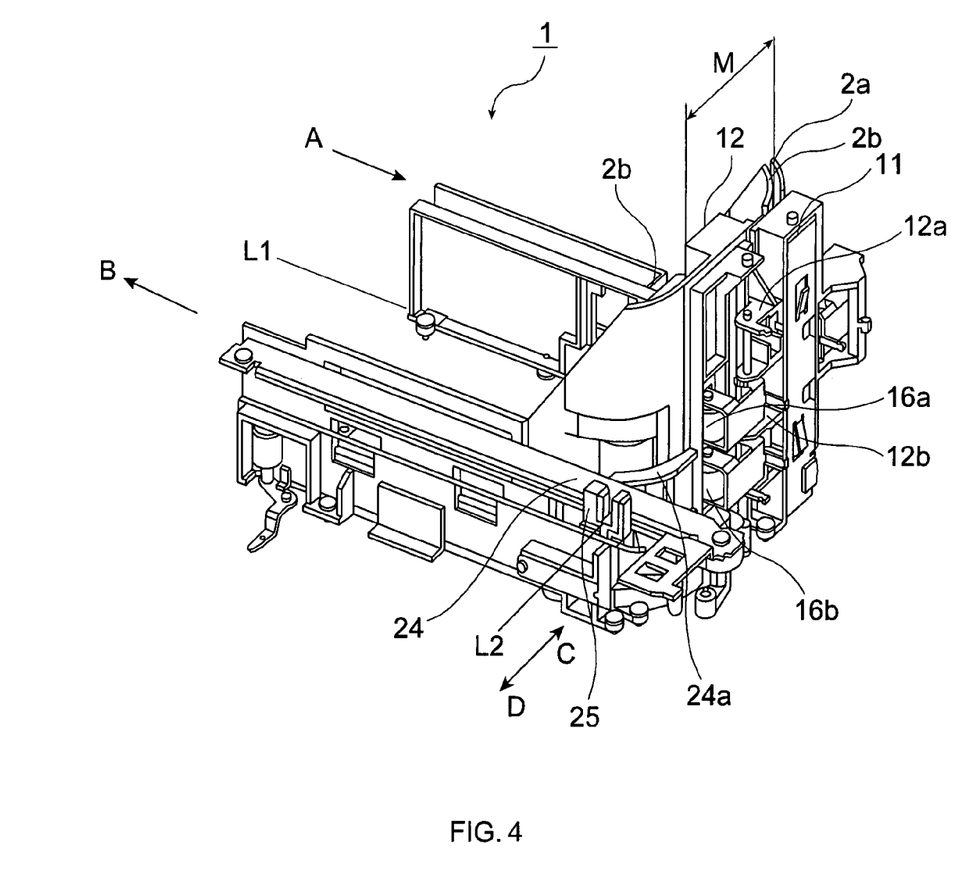
FIG. 4 is an oblique view of check processing terminal of FIG. 1 with the outside case removed.

A check S delivered into the first transportation path P1 is conveyed through the middle transportation path M by the first transportation roller pair 6, middle transportation roller set 16, and second transportation roller pair 7 as shown in FIG. 3, and is then discharged from the paper exit 4 in the direction of arrow B by the discharge rollers 8. As shown in FIG. 4, the bottom of the first transportation path P1 is held at height L1, and checks S are conveyed referenced to this height L1 along the bottom of the first transportation path P1, including through the middle transportation path M.

If the width (height) of the check S is less than a predefined height, the check S is conveyed by the lower pressure roller 16b and drive roller 17 of the middle transportation roller set 16. If the check S width is equal to or greater than this predefined height, the check S is conveyed by the drive roller 17 and both upper pressure roller 16a and lower pressure roller 16b.

As shown in FIG. 2 and FIG. 3, the second transportation path P2 includes the middle transportation path M and the card insertion slot 20 and card reversing path 21 that are contiguous to opposite ends of the middle transportation path M.

The card insertion slot 20 is an opening for inserting a card C to the middle transportation path M. As shown in FIG. 3 and FIG. 4, bottom guides 24 and 24a are disposed below the card insertion slot 20. These bottom guides 24 and 24a are part of the outside guide 2a, and hold the bottom edge of the card C at a specific height L2. The card C is guided by bottom guide 24 and inserted to the middle transportation path M, and then transported at this height L2. More specifically, the bottom of the second transportation path P2 is held at height L2 referenced to bottom guides 24 and 24a. Note that a check S conveyed through the first transportation path P1 at height L1 is guided by this bottom guide 24a so that the direction of check S travel bends and the check S is conveyed toward the paper exit 4.

The upper pressure roller 16a is disposed to the second transportation path P2 at a position above height L2. A card C conveyed into the middle transportation path M is transported through the middle transportation path M by the upper pressure roller 16a and drive roller 17.

The card reversing path 21 is formed by straight guides 21a, 21b rendered as straight extensions of the middle transportation path M to the left side as seen in FIG. 2. Forward/reverse transportation rollers 22 are disposed near the end portion 21c of this card reversing path 21. The forward/reverse transportation rollers 22 convey a card C transported from the middle transportation path M so that the card C overhangs a specific length from the end portion 21c of the card reversing path 21, and then deliver the card C overhanging from the end portion 21c back into the middle transportation path M.

More specifically, when a card C is inserted from the card insertion slot 20 to the middle transportation path M, the card C is conveyed by the upper pressure roller 16a and drive roller 17 to the card reversing path 21. The card C is then reversed by the forward/reverse transportation rollers 22 and conveyed from the card reversing path 21 through the middle transportation path M until the card C is discharged from the card insertion slot 20. The card C is conveyed through the second transportation path P2 with the bottom edge of the card C held at height L2. Note that in this embodiment of the invention height L2 of the second transportation path P2 is located at a position higher than height L1 of the first transportation path P1. Cards C thus travel through the middle transportation path M at a height above the checks S.

By conveying checks S and cards C at different elevations, this embodiment of the invention can transport different types of media through a U-shaped first transportation path and a straight second transportation path without requiring special switching means to change the transportation path. This embodiment of the invention thus transports checks S and cards C as described above.

A first image scanning sensor 11 and a second image scanning sensor 12 for imaging media are disposed to the middle transportation path M. The first image scanning sensor 11 and second image scanning sensor 12 are contact image sensor (CIS) type image scanners, and thus illuminate the surface of a check S or card C travelling through the middle transportation path M and detect light reflected from the check S or card C. The first image scanning sensor 11 and second image scanning sensor 12 image the check S or card C travelling through the middle transportation path M one scan line at a time to acquire a two-dimensional image of the check S or card C.

A BOF (bottom of form) detector 9 and TOF (top of form) detector 10 for detecting the respective ends of a check S are disposed to the first transportation path P1. The BOF detector 9 is located between the paper supply section 3 and first transportation roller pair 6, detects a check S inserted from the paper supply section 3, and detects the trailing edge (bottom of form) of the check S by detecting when the check S passes the BOF detector 9.

The TOF detector 10 is disposed between the first transportation roller pair 6 and first image scanning sensor 11 to detect the leading edge (top of form) of the check S.

The length of the check S can thus be accurately measured as a result of the BOF detector 9 and TOF detector 10 detecting the leading and trailing edges of the check S.

A hybrid processing apparatus 1 according to this embodiment of the invention is designed to operate according to detection of a check S by the BOF detector 9 and TOF detector 10. More specifically, starting and stopping the image scanning sensors 11, 12 imaging a check S is controlled based on output from the BOF detector 9 and TOF detector 10. It should be noted that either one of the image scanning sensors 11, 12 could be used to detect the leading edge of the check S, in which case the TOF detector 10 is unnecessary and can be omitted.

A print head 14 is also disposed to a straight portion of the first transportation path P1 between the second transportation roller pair 7 and discharge rollers 8. This print head 14 is for printing an endorsement on the check S, and prints to the check S as required.

A BOC (bottom of card) detector 25 and a TOC (top of card) detector 26 are also disposed to the second transportation path P2. The BOC detector 25 is disposed near the card insertion slot 20, detects when a card C is inserted from the card insertion slot 20, and detects when the card C has passed the BOC detector 25 to detect the trailing edge of the card C.

The TOC detector 26 is disposed between the middle transportation roller set 16 and second image scanning sensor 12, and detects the leading edge of the card C.

The length of the card C can thus be accurately measured as a result of the BOC detector 25 and TOC detector 26 detecting the leading and trailing edges of the card C.

The check processing terminal 1 according to this embodiment of the invention also operates according to card C detection by the BOC detector 25 and TOC detector 26. More specifically, starting and stopping scanning a card C by means of image scanning sensor 11 or 12 is controlled based on output from the BOC detector 25 and TOC detector 26. It should be noted that either one of the image scanning sensors 11, 12 could be used to detect the leading edge of the card C, in which case the TOC detector 26 is unnecessary and can be omitted.

Figure 9:
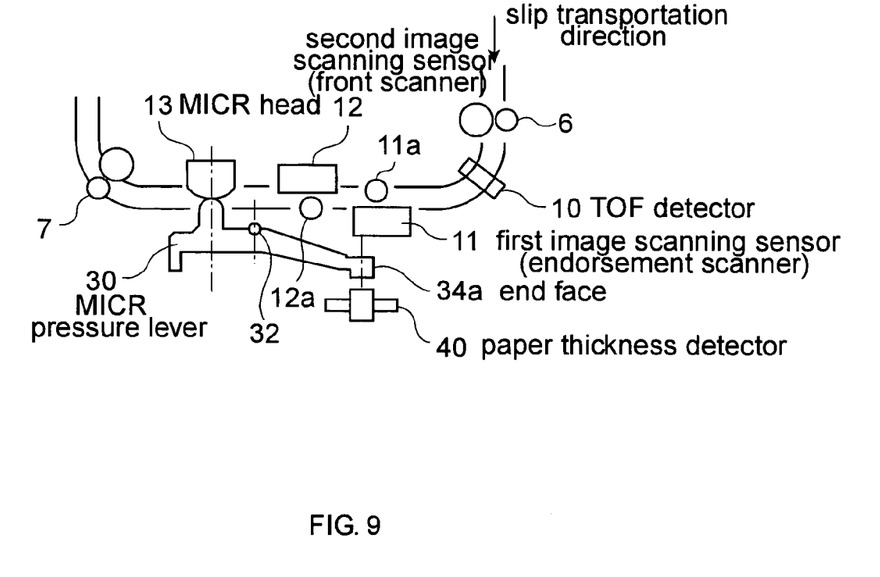
FIG. 9 is a plan view showing a variation of the check multifeed detection apparatus according to the present invention.

An MICR (magnetic ink character reader) 13 is disposed below the drive roller 17 on one side of the transportation path. This MICR 13 is a sensor for reading information written in magnetic ink on a check S. A pressure lever 30 as shown in FIG. 9 is disposed on an opposite side of the transportation path and is aligned opposite to the position of the MICR 13 such that a check S fed along the middle transportation path M is pressed therebetween against the surface of the MICR 13 for reading. In the preferred embodiment of the present invention the MICR 13 represents a component of a multifeed detection apparatus 50 which also includes the pressure lever 30 and a sensor 40 as diagrammatically shown in FIG. 6 and as shown in FIG. 9.

The pressure lever 30 has a long main portion 31 on one end of which is disposed a rotary shaft 32. The pressure lever 30 pivots on this rotary shaft 32 in a plane perpendicular to the check transportation surface of the middle transportation path M. A pressure portion 33 is formed integrally to the main portion 31 projecting toward the middle transportation path side. This pressure portion 33 is urged toward a rigid surface 13a in the MICR 13 by the force of a pressure spring (not shown). When a check S is not present, the rigid surface 13a of the MICR 13 and the contact surface 33a of the pressure portion 33 are in mutual engaging contact.

The contact surface 33a of the pressure portion 33 is rigid or is a rigid member that will not shift or deform due to pressure from the pressure portion 33 in this embodiment of the invention. When the contact surface 33a of the pressure portion 33 contacts the MICR 13, the lengthwise direction of the main portion 31 is usually held substantially parallel to the middle transportation path M transporting the check S.

The detection apparatus 50 when used in a check processing terminal as shown e.g. in FIG. 1 provides the following advantages:

(1) each check S will pass the MICR 13 without fail
(2) the MICR 13 does not move
(3) any check S which is wrinkled is mended by the large pressed load formed by the detection apparatus 50

The distal end portion of the main portion 31 has a bent portion 34 turned substantially 90 degrees away from the middle transportation path M. A displacement detection sensor 40 is located opposite the end face 34a of the bent portion 34 and is separated a specified distance from the end face 34a.

This displacement detection sensor 40 is a sensor for detecting displacement of the detection surface, that is, the end face 34a of the bent portion 34, and is, for example, an optical sensor that measures the distance to the end face 34a by illuminating the end face 34a and detecting light reflected from the end face 34a by means of photodetector 40a. An Omron Z4D-B01 reflection-type optical microdisplacement sensor was used as the displacement detection sensor 40 in this embodiment of the invention.

Assuming that L1 is the distance from the rotational axis of the rotary shaft 32 to a line passing through the end of the pressure portion 33 substantially parallel to the direction in which the pressure portion 33 protrudes, and L2 is the distance from the rotational axis of the rotary shaft 32 to a line passing through the detection point of the end face 34a of the bent portion 34 parallel to the direction in which the pressure portion 33 protrudes, the pressure portion 33 is made so that the relationship between distance L1 and distance L2 shown in equations (1) and (2) is true.

$$L2 = L1 \times N (N>1) \tag{1}$$

That is, $$L2 > L1 \tag{2}$$

Figure 6:
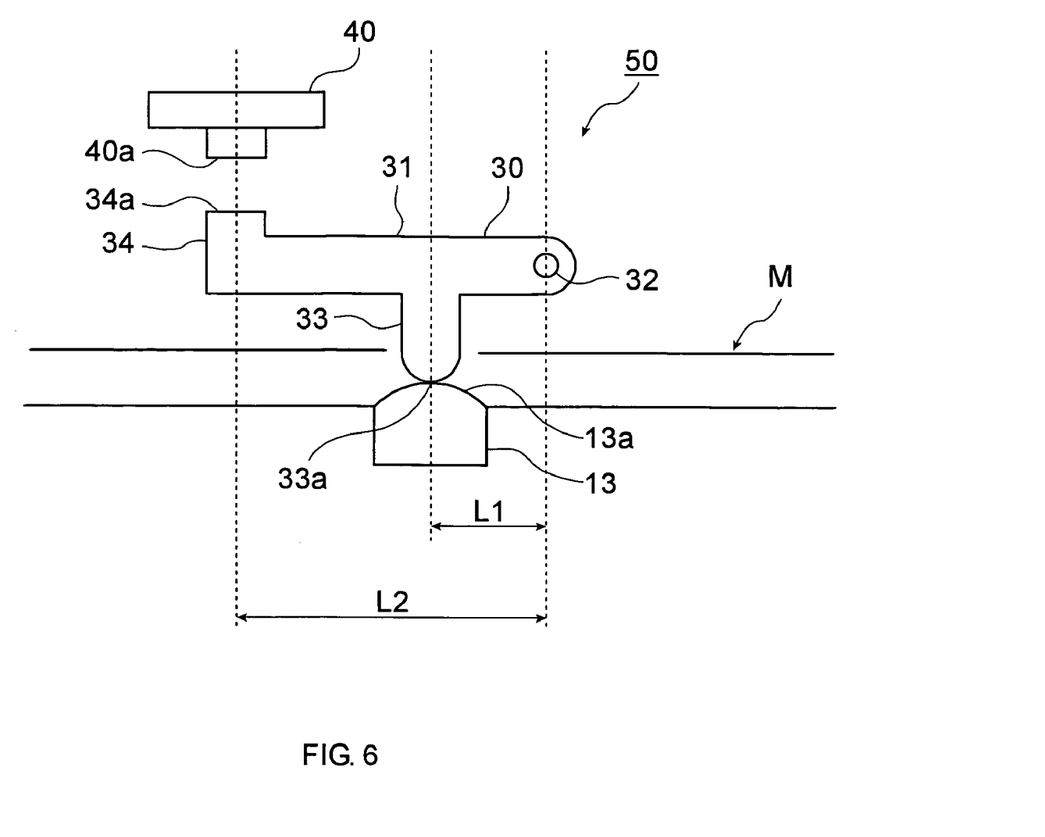
FIG. 6 schematically shows the multifeed detection apparatus according to the present invention for use in the check processing terminal of FIG. 1.

As shown in equation (2), the pressure lever 30 is made so that distance L2 is greater than distance L1. As shown in FIG. 6, the MICR 13, pressure lever 30, and displacement detection sensor 40 form a multifeed detection apparatus 50 in this embodiment of the invention. The operation of this multifeed detection apparatus 50 is described further below with reference to FIG. 7A and FIG. 7B.

Figure 7:
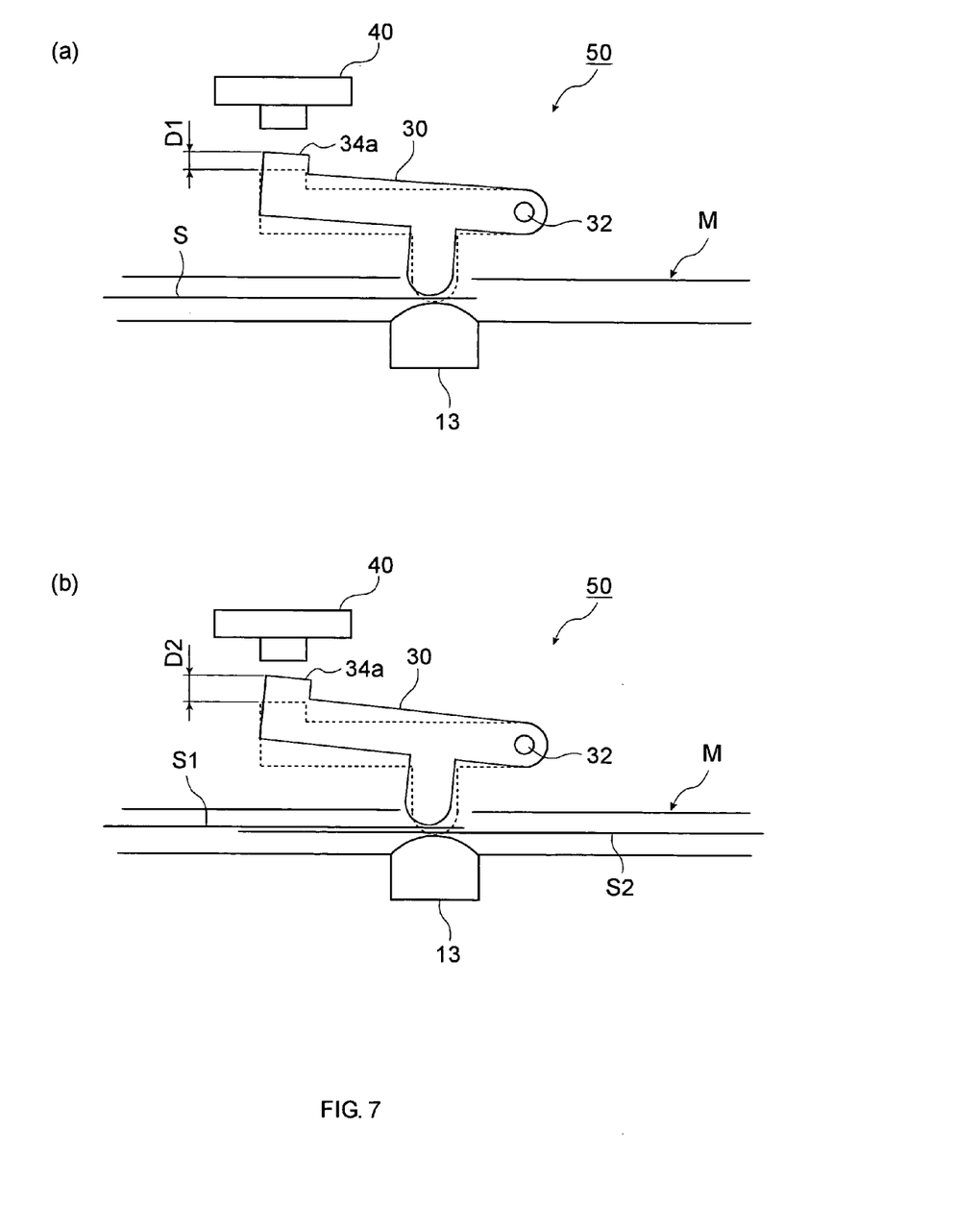
FIG. 7 is divided into FIGS. 7A, and 7B with FIG. 7A showing one check S travelling through the middle transportation path (the normal position) of FIG. 2, and FIG. 7B showing two checks being fed at the same time through the middle transportation path (the multifeed position) of FIG. 2.

FIG. 7A shows the situation (normal position) when one check S is travelling through the middle transportation path M, and FIG. 7B shows the situation (multifeed position) when two checks S are fed at the same time through the middle transportation path M, that is, checks S1 and S2 overlap as they are conveyed through the middle transportation path M.

When one check S is transported from the left to right through the middle transportation path M as shown in FIG. 7A and travels between the MICR 13 and pressure portion 33 of the pressure lever 30, the pressure portion 33 of the pressure lever 30 is pushed by the thickness d of the check S in resistance to the force acting thereon, and the pressure lever 30 therefore pivots upward (that is, moves rotationally in the clockwise direction as seen in FIG. 7A).

When the pressure lever 30 thus pivots, the end face 34a of the pressure lever 30 is displaced, and the displacement detection sensor 40 detects the distance between this end face 34a and the photodetector 40a of the displacement detection sensor 40. Displacement $D_1$ of the end face 34a of the pressure lever 30 varies according to distances L1 and L2 as shown in the following equation.

$$D_1 \approx d \times L2/L1 \quad (D_1 \text{ nearly equals } d \times L2/L1) \tag{3}$$

This displacement $D_1$ of the end face 34a of the pressure lever 30 is thus greater than the thickness d of the check S located between the MICR 13 and the pressure portion 33 of the pressure lever 30. The hybrid processing apparatus 1 can determine if only one check S is being transported as a result of the displacement detection sensor 40 detecting this displacement $D_1$.

If two checks S1 and S2 overlap as they travel through the middle transportation path M as shown in FIG. 7B and pass between the MICR 13 and the pressure portion 33 of the pressure lever 30, the pressure portion 33 of the pressure lever 30 is again pushed up against the spring pressure causing the pressure lever 30 to pivot (that is, move rotationally in the clockwise direction as seen in FIG. 7B) as described above. In this case, however, the pressure portion 33 is raised by thickness of the overlapping checks S, or thickness 2$d$ in this example. The pressure lever 30 therefore pivots a greater distance than when only one check S is conveyed.

When the pressure lever 30 thus pivots, the end face 34$a$ of the pressure lever 30 is displaced, and the displacement detection sensor 40 detects the distance between this end face 34$a$ and the photodetector 40$a$ of the displacement detection sensor 40. Displacement $D_2$ of the end face 34$a$ of the pressure lever 30 varies according to distances L1 and L2 as shown in the following equation.

$$D_2 \approx 2d \times L2/L1 \quad (4)$$

$$D_2 \approx 2D_1 \quad (5)$$

Displacement $D_2$ of the end face 34$a$ of the pressure lever 30 is thus greater than the overlapping thickness 2$d$ of the checks S1 and S2 passing between the MICR 13 and the pressure portion 33 of the pressure lever 30, and obviously greater than the displacement $D_1$ when only one check S is conveyed. When the displacement detection sensor 40 detects this displacement $D_2$, the hybrid processing apparatus 1 can determine that two checks S are being conveyed, that is, can detect if more than one check S is being fed at a time, and can therefore call an appropriate error handling process such as stopping check S transportation, lighting a warning indicator, or outputting an alarm.

A hybrid processing apparatus 1 according to the foregoing embodiment of the invention thus has a multifeed detection apparatus 50 including a pressure lever 30 and a displacement detection sensor 40 for detecting displacement of the pressure lever 30. The pressure lever 30 is a pressure member located on one side of the middle transportation path M (form transportation path) in order to press checks S to the surface 13$a$ of an MICR 13 located on the other side of the middle transportation path M. The displacement detection sensor 40 detects multifeeding checks S by detecting the displacement of the pressure lever 30, which is displaced according to thickness of the check or checks.

Because the MICR 13 is stationary and the surface 13$a$ of the MICR 13 is a rigid surface, pressure by the pressure lever 30 does not cause displacement of the MICR 13 or deformation of the surface 13$a$ of the MICR 13. The surface 13$a$ of the MICR 13 can therefore be used as a stable reference surface for determining displacement of the pressure lever 30, and the thickness of the conveyed medium (checks S) can be reliably detected by detecting displacement of the pressure lever 30.

Therefore, even if the paper supply section 3 feeds two checks S so that checks are multifeed as shown in FIG. 7B, multifeeding of checks can be reliably detected by using the multifeed detection apparatus 50 to detect check thickness. Scanning and printing errors due to multifeeding can therefore be reliably prevented.

As also described above, the pressure lever 30 in this embodiment of the invention has a pressure portion 33 for pressing checks S to the surface 13$a$ of the MICR 13, an end detection face 34$a$ opposite and detected by the displacement detection sensor 40, and is constructed so that when the pressure lever 30 pivots, the displacement of the end face 34$a$ is greater than the displacement of the pressure portion 33. In other words, the pressure lever 30 of this embodiment of the invention is designed so that displacement of the end face 34$a$, that is, the detection surface, actually amplifies the thickness of the check. Therefore, while checks are very thin and detecting check thickness requires corresponding precision, the displacement that is actually detected is the displacement that amplifies the actual check thickness. Overfeed detection is therefore simple compared with directly detecting check S thickness, and the reliability of check multifeed detection can be improved.

The displacement detection sensor 40 for measuring the distance to the end face 34$a$ of the pressure lever 30 that is displaced according to the thickness of the check S is an optical sensor in this embodiment of the invention. Therefore, even if the check S sags or is wrinkled or creased, the check S is pressed by the pressure portion 33 to the MICR 13 while displacement is measured by illuminating a consistently flat end face 34$a$, and check thickness can be reliably detected.

The pressure lever 30 is described as being pressed to the surface 13$a$ of the MICR 13 in the foregoing embodiment, but the invention shall not be so limited. More particularly, the pressure lever 30 could press the scanning medium against any stationary fixed object that is not displaced or deformed. The pressure lever 30 could, for example, be rendered to press the medium to the inside wall of the middle transportation path M, or to one of the image scanning sensors 11 or 12.

Furthermore, while the displacement detection sensor 40 is described in the foregoing embodiment as being an optical sensor, the invention shall not be so limited and any displacement sensor (including magnetic and potential detection sensors) capable of detecting displacement of the pressure lever 30 can be used.

The multifeed detection apparatus 50 is described in the foregoing embodiment as used for multifeed detection of checks S, but the invention shall not be so limited. This multifeed detection apparatus 50 could, for example, be used as a thickness detector for detecting the thickness of different media, such as thin paper and thick paper.

FIG. 9 shows a check thickness detector according to another implementation of the present invention.

Referring to FIG. 9, a check S inserted from the slip form transportation direction as indicated by the arrow at the top right in FIG. 9 passes the first transportation roller pair 6 and TOF detector 10, the back of the check S is scanned by the first image scanning sensor 11, and the front of the check S (the side on which MICR text is printed) is read by the second image scanning sensor 12.

The paper thickness sensor 40 is disposed opposite the end face 34$a$ (detection face) of the MICR pressure lever 30 pressing the check S to the MICR head 13. When a check (a slip form or check) S is conveyed and nipped between the MICR head 13 and MICR pressure lever 30, the MICR pressure lever 30 is pushed away from the MICR head 13. The MICR pressure lever 30 thus pivots on support shaft 32, the detection face 34$a$ of the MICR pressure lever 30 is displaced, and the distance from the detection face 34$a$ to the paper thickness sensor 40 changes. The paper thickness sensor 40 in this implementation outputs a voltage according to the distance to the detection face 34$a$.

Figure 10:
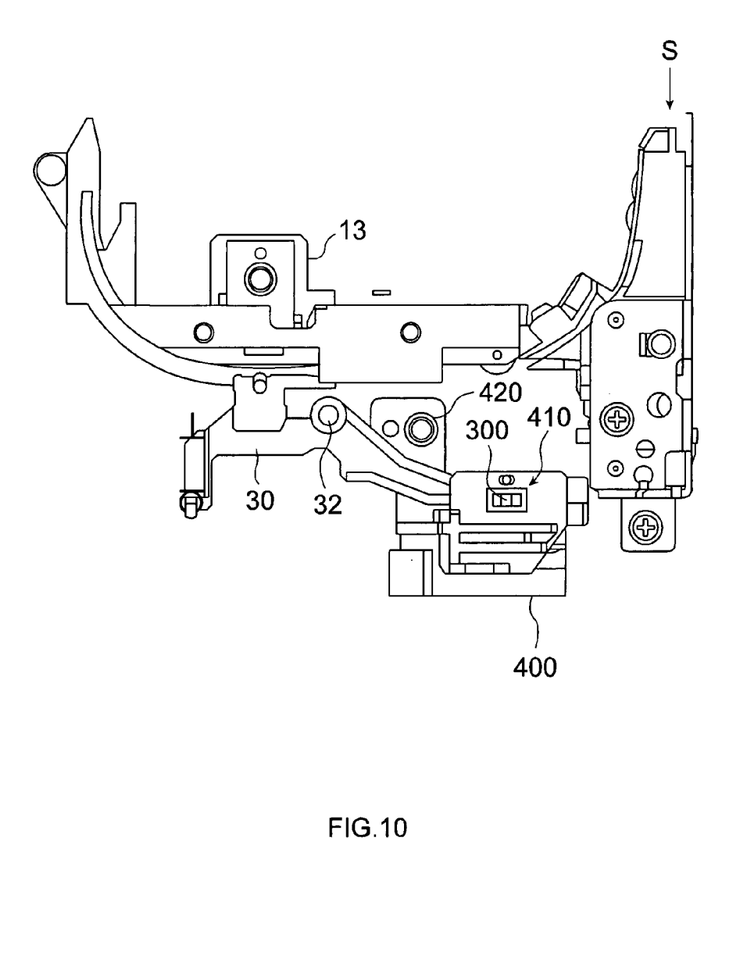
FIG. 10 shows the arrangement in FIG. 9 in greater detail.

FIG. 10 is a detailed view of the implementation shown in FIG. 9, specifically describing positioning the displacement detection sensor 40.

The protrusion 300 at the distal end portion of the paper pressure lever 30 can be viewed through a window 410 rendered in a paper thickness detector positioning member 400, inside of which the paper thickness detection sensor 40 is integrally disposed. The position of the paper thickness detector positioning member 400 can be moved forward and back, left and right, and firmly fastened with a screw 420 so that the protrusion 300 is accurately positioned to the window 410.

Figure 5:
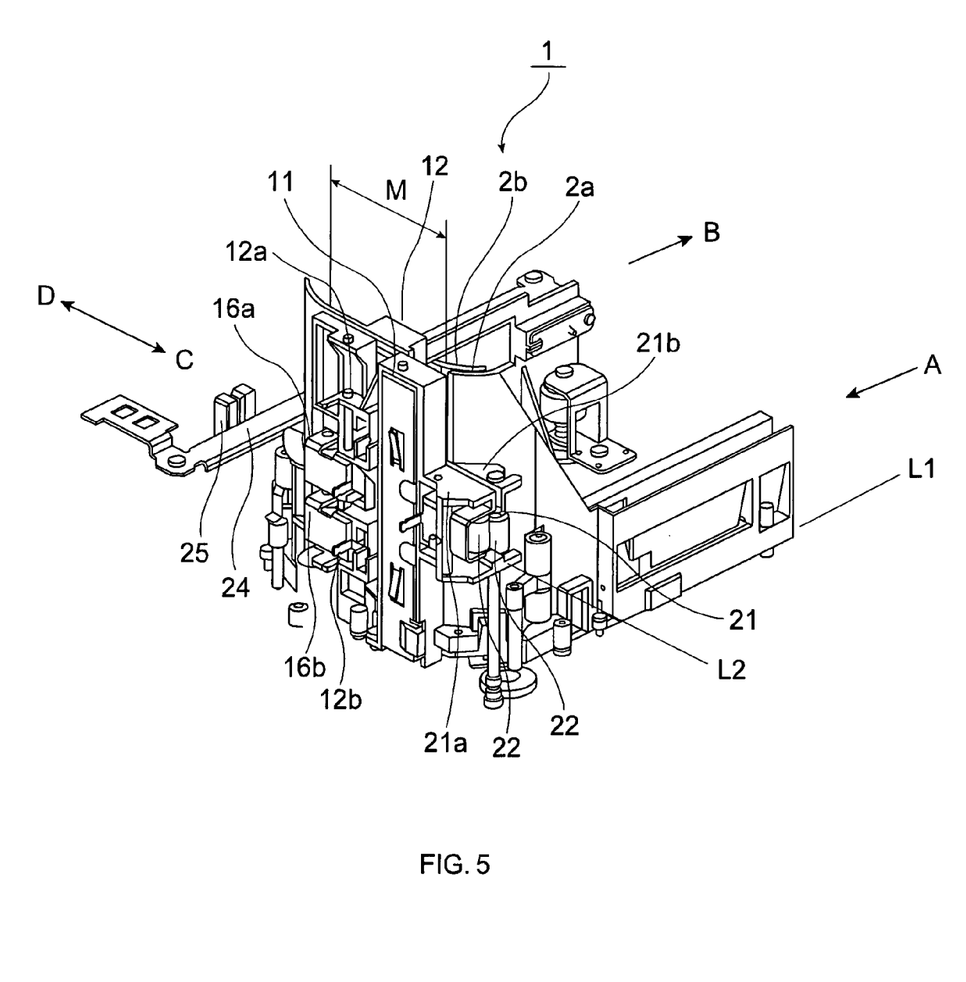
FIG. 5 is another oblique view of the check processing terminal of FIG. 1 with the outside case removed.
Figure 11:
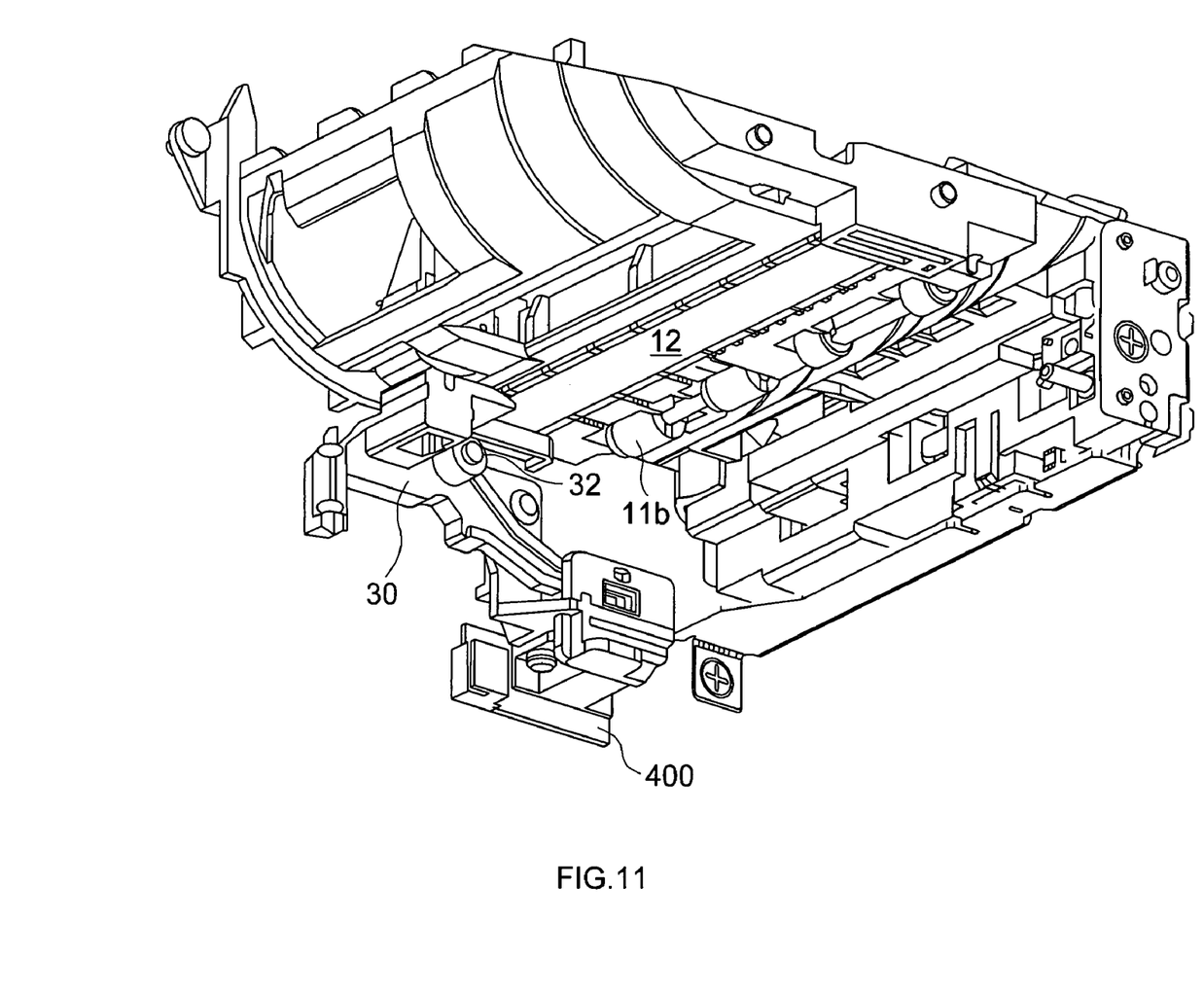
FIG. 11 is an oblique view of an MICR reading apparatus incorporating the assembly shown in FIG. 10, shown with the first image scanning sensor 11 removed.

FIG. 11 shows the paper thickness detector assembly shown in FIG. 10 assembled in the MICR reader shown in FIG. 4 and FIG. 5 with the first image scanning sensor 11 and roller 12a opposite the second image scanning sensor 12 removed.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A check multifeed detection apparatus for use in a check processing terminal including a paper supply unit for individually feeding a plurality of checks;
   a check transportation unit for conveying each check fed from said paper supply unit along a check transportation path in a given direction and;
   a MICR head disposed on one side of the check transportation path having a non-movable contact surface, said check multifeed detection apparatus comprising:
   a pressure member having a pressure portion disposed on another side of the check transportation path at a first position opposite to said non-movable contact surface for pressing one or more transported checks passing therebetween against said MICR head;
   a detection surface located on said pressure member at a second position laterally separated from said first position; and
   a displacement detection sensor in opposing juxtaposition to said detection surface for detecting the physical displacement of the pressure member from said non-movable contact surface to detect multifeeding of transported check(s) according to the thickness of the transported check(s).

2. The check multifeed detection apparatus according to claim 1 further comprising an image scanning sensor for reading information from each check transported along said check transportation path.

3. The check multifeed detection apparatus according to claim 1, wherein displacement of said pressure portion of said pressure member causes a displacement of the detection surface greater than the displacement of the pressure portion.

4. The check multifeed detection apparatus according to claim 3, wherein the pressure member is a lever that pivots circularly on a rotary shaft.

5. The check multifeed detection apparatus according to claim 3, wherein the displacement detection sensor is an optical sensor for measuring displacement distance moved by the detection surface of said pressure member in response to the displacement of the pressure portion.

6. A check multifeed detection method comprising the steps of:
   individually feeding a plurality of checks from a paper supply unit;
   conveying each check fed from the paper supply unit to a check transportation unit for transporting each check along a transportation path in a given direction;
   locating a MICR head having a non-movable contact surface on one side of the transportation path;
   locating a pressure member on another side of the check transportation path at a first position opposite to said non-movable contact surface for pressing one or more transported checks passing therebetween against said MICR head; and
   locating a displacement detection sensor at a second position laterally separated from said first position for detecting physical displacement of the pressure member from said non-movable contact surface according to the check thickness.

7. A check multifeed detection method according to claim 6 further comprising an image scanning sensor disposed for reading information from each check being transported along the check transportation path.

8. A check multifeed detection method according to claim 7 wherein said MICR head reads magnetic ink characters printed on the check.

9. A check multifeed detection method according to claim 7 wherein said displacement detection sensor is located to detect the displacement of a detection surface disposed on one end of a pivotally rotatable lever having another end connected to said pressure member such that displacement of said pressure member causes a magnified displacement of said detection surface.

10. A check multifeed detection method according to claim 6 wherein said displacement detection sensor optically detects the displacement of the pressure member.

* * * * *